United States Patent
Yerli

(10) Patent No.: US 11,481,980 B2
(45) Date of Patent: Oct. 25, 2022

(54) TRANSITIONING FROM PUBLIC TO PERSONAL DIGITAL REALITY EXPERIENCE

(71) Applicant: THE CALANY HOLDING S.À.R.L., Luxembourg (LU)

(72) Inventor: Cevat Yerli, Frankfurt am Main (DE)

(73) Assignee: THE CALANY HOLDING S.Á R.L., Luxembourg (LU)

(*) Notice: Subject to any disclaimer, the term of this patent is extended or adjusted under 35 U.S.C. 154(b) by 0 days.

(21) Appl. No.: 16/545,947

(22) Filed: Aug. 20, 2019

(65) Prior Publication Data
US 2021/0056758 A1    Feb. 25, 2021

(51) Int. Cl.
G06T 19/00    (2011.01)
G06F 21/62    (2013.01)
H04W 4/021   (2018.01)

(52) U.S. Cl.
CPC ........ *G06T 19/006* (2013.01); *G06F 21/6245* (2013.01); *G06T 19/003* (2013.01); *H04W 4/021* (2013.01)

(58) Field of Classification Search
CPC combination set(s) only.
See application file for complete search history.

(56) References Cited

U.S. PATENT DOCUMENTS

| 9,792,594 | B1* | 10/2017 | Bayha | ............... G06Q 20/1085 |
| 10,331,874 | B1* | 6/2019 | Benkreira | ............. G07F 7/1041 |
| 2012/0242695 | A1* | 9/2012 | Martin | ................ G06F 21/42 |
| | | | | 345/633 |

(Continued)

FOREIGN PATENT DOCUMENTS

| GB | 2352923 A | 2/2001 |
| JP | 2001036891 A | 2/2001 |

(Continued)

OTHER PUBLICATIONS

Extended European Search Report dated Dec. 9, 2020, issued in corresponding European Application No. EP 20191246.6, filed Aug. 17, 2020, 12 pages.

(Continued)

*Primary Examiner* — Andrew G Yang
(74) *Attorney, Agent, or Firm* — Christensen O'Connor Johnson Kindness PLLC

(57) ABSTRACT

A system and method for allowing a smooth transition between a public digital reality experience into a private digital reality experience. A cloud server delimitates a public digital zone where interactions with digital reality applications stored in the cloud server and corresponding digital content are viewable to all users in the public digital zone. When users access the public digital zone, the cloud server detects the users and provides digital content from the digital reality to the users via digital reality devices. Upon reaching predetermined levels of interaction, users may access a personal digital reality view, whereby a smooth transition from a public to a personal digital reality experience takes place, prompting a specific portion of computing power from the cloud server to be dedicated to the specific user to enable personal interactions with the digital content. Users may also invite other users to engage in a multi-user private streaming.

20 Claims, 7 Drawing Sheets

(56) References Cited

U.S. PATENT DOCUMENTS

| | | | |
|---|---|---|---|
| 2014/0368537 A1* | 12/2014 | Salter | G06F 3/011 |
| | | | 345/633 |
| 2015/0062158 A1 | 3/2015 | Hildreth et al. | |
| 2016/0188886 A1* | 6/2016 | Weiss | G06F 21/6245 |
| | | | 726/26 |
| 2017/0168585 A1* | 6/2017 | Faaborg | G06F 3/1454 |
| 2018/0005429 A1* | 1/2018 | Osman | G06T 15/20 |
| 2018/0005441 A1* | 1/2018 | Anderson | G06T 19/006 |
| 2018/0074332 A1* | 3/2018 | Li | G06F 3/012 |
| 2018/0098059 A1* | 4/2018 | Valdivia | H04L 67/131 |
| 2018/0107835 A1 | 4/2018 | Clement et al. | |
| 2018/0157333 A1 | 6/2018 | Ross et al. | |
| 2018/0211183 A1* | 7/2018 | Innes | G06Q 10/02 |
| 2018/0250589 A1* | 9/2018 | Cossairt | G06F 3/011 |
| 2018/0293798 A1 | 10/2018 | Energin et al. | |
| 2018/0356885 A1* | 12/2018 | Ross | G06Q 10/101 |
| 2019/0379948 A1* | 12/2019 | McClam | G06T 19/006 |

FOREIGN PATENT DOCUMENTS

| | | | |
|---|---|---|---|
| JP | 2015118578 A | 6/2015 | |
| JP | 2016048301 A | 4/2016 | |
| JP | 2019522856 A | 8/2019 | |

OTHER PUBLICATIONS

Office Action dated Oct. 5, 2021, in corresponding Japanese application No. 2020-137817, 10 pages.
Office Action dated Nov. 16, 2021, in corresponding Indian application No. 202014035246, 7 pages.
Office Action dated Jun. 7, 2022, in corresponding Japanese application No. 2020-137817, 9 pages.

* cited by examiner

TRANSITIONING FROM PUBLIC TO PERSONAL DIGITAL REALITY EXPERIENCE

BACKGROUND

Technology developments for providing digital content to users have enabled experiences that were not possible in the past. Particularly, augmented reality (AR) and virtual reality (VR) change a user's perception on what they are seeing, hearing, and feeling, and how much of the real world comes into these experiences, providing the user with a sensation of a physical presence in places in the real world or an imagined world.

A typical way to accomplishing these more immersive interactive experiences is to use head-mounted digital reality devices. These devices may usually include a central processing unit (CPU), a graphics processing unit (GPU) for processing intensive graphics operations, a vector unit for performing geometry transformations, and other glue hardware, firmware, and software. However, highly dynamic and interactive applications such as those including AR and VR experiences are primarily downloaded and hosted on the client (device) side, resulting in high hardware demands to execute the applications. Additionally, to accommodate the GPUs and achieve their desired performance, high quality head-mounted digital reality devices are currently physically tethered to very powerful and expensive personal computers (PCs). These requirements create larger adoption barriers due to high price points and limited mobility, which detracts from the overall experience, such as limiting the capability and flexibility for rapidly migrating from a personal to a public experience. Moreover, streaming complex, interactive AR/VR 3D graphics requires high data rates.

Reducing hardware and network demands along with adoption barriers for digital realities motivates the desire to offload computationally intensive tasks to one or more powerful remote servers, or cloud servers. Typical applications dominant today (asynchronous or one-way-delivery applications like instant messaging, web page loading, etc.) which employ cloud computing can tolerate around 100+ms of latency, and are supported by existing network infrastructure, content delivery networks (CDN), and centralized cloud computing. This architecture is optimized for the delivery of static, predefined content with minimal levels of dynamic interaction. However, dynamic AR/VR applications require real-time interaction, and thus extremely low latency (around 7 ms), placing very high demands on the network and limiting the quality and variety of digital reality experiences that users may enjoy.

What is desired is a system and method that enables reducing hardware and network demands and expands the capabilities of digital reality experiences.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Drawbacks described in the background are addressed by the current disclosure through a system and method that allows a smooth transition from a public to a personal digital reality experience while reducing hardware and network demands. Described embodiments provide smooth transitions from public to private digital reality experiences by reacting to levels of interaction with digital content to determine whether to perform the transition, without requiring a user to specifically select or request such a transition. This allows the user to enjoy the benefits of transitioning from a public experience of the digital content to a personal experience without interruption. The system and method reduces hardware and network demands by offloading computationally intensive tasks to cloud servers. The cloud servers may perform data computations and rendering to display the same digital content to all users located in a public digital reality zone. Then, through increasing levels of interaction between users and the digital content via digital reality devices, users may access a personal digital reality view through digital reality devices. The digital reality devices may be for example, mobile devices, personal computers, game consoles, media centers, and head-mounted displays, amongst others. The digital content provided by the one or more digital reality applications may include 3D image data, 3D geometries, 3D entities, 3D sensory data, 3D dynamic objects, video data, audio data, textual data, time data, positional data, orientational data, haptic data, and lighting data, amongst others.

In an embodiment, a system for enabling a public-to-personal digital reality experience transition comprises a cloud server system comprising one or more server computers, the cloud server system storing one or more digital reality applications and being programmed to delimitate a public digital zone where interactions with one or more digital reality applications stored in the cloud server and corresponding digital content are viewable in a public digital reality view via digital reality devices in the public digital zone. The cloud server system is programmed to detect at least one of the digital reality devices accessing the public digital reality zone; detect a level of interaction with the digital content by the at least one digital reality device; and determine that the detected level of interaction has reached a predetermined level of interaction with the digital content. The detected level of interaction may be selected from among a plurality of levels of interaction comprising seeing the digital content, looking at the digital content, clicking on the digital content, engaging with the digital content, and immersing in the digital content. Upon the cloud server detecting one or more digital reality devices accessing the public digital reality zone and after the digital reality devices reach predetermined levels of interaction with the digital content (e.g., the clicking level or the engaging level), the cloud server enables the digital reality devices to switch from a public digital reality view to a personal digital reality view comprising digital content viewable only to a particular user interacting with the digital reality content. Alternatively, the personal digital reality view may be viewable by a first user and one or more other authorized users, such as users that have been invited by the first user.

In some embodiments, the cloud server system is further programmed to perform the steps of retrieving digital content from the one or more digital reality applications, and perform data computations and rendering on the digital content; sending the digital content to the digital reality devices in a current public digital reality zone; receiving input data from the digital reality devices; and updating the one or more digital reality applications.

In some embodiments, the cloud server system is further programmed to, when a digital reality device receives personal digital content, allocate a dedicated amount of computing power from the cloud server system for the experience of the user of the digital reality device. Users receiving personal digital content may also invite one or more other users located in the public digital reality zone to start interacting in a personal shared digital reality view. When an invited user receives personal shared digital content through an additional digital reality device (e.g., after accepting an invitation to view the shared content), a dedicated amount of computing power from the cloud server system is then allocated for that specific invited user, to be experienced through that additional digital reality device.

In an embodiment, the one or more users may view personal digital content after clicking on the public digital content. In other embodiments, the user may view personal digital content through other forms of interaction with the public digital content, such as by engaging with the digital content through gestures, facial expressions, speech, body, hand or finger movements (e.g., horizontal or vertical movements, rotation, etc.), zooming in or out, stylus movements, air gestures, brain activity, and head and eye movements, amongst others.

According to an embodiment, users entering a public digital reality zone as a public augmented reality (AR) or virtual reality (VR) zone may enjoy various types of interaction with AR or VR digital content. These interactions define whether the digital reality application provides public or personal digital content. In some embodiments, when accessing a public AR or VR zone, the levels of interaction comprise seeing the digital reality content and looking at the digital reality content. In response to higher levels of interaction (e.g., clicking or engaging), users may experience a smooth transition from a public view to a personal view. In such embodiments, the cloud server system may be further programmed to receive input data from a digital reality device and provide, in response to the received input data, the at least one digital reality device with access to a personal view (e.g., a personal AR view or a personal VR view). The received input data may include, e.g., input associated with clicking on public augmented reality content or public virtual reality content from a respective public augmented reality zone or public virtual reality zone.

In some embodiments, the levels of interaction within the personal AR view comprise engaging with the AR content, and fully immersing into the AR content by switching from a personal AR view to a personal VR view. In other embodiments, levels of interaction within the personal VR view comprise engaging with the personal VR content.

In some embodiments, the cloud server may be one or more remote servers including computing resources sufficient to carry out heavy load applications such as data computations and rendering digital content from one or more sources, such as one or more digital reality applications. Additionally, the cloud server may be configured to provide a combined single data stream to at least one digital reality device.

In yet a further embodiment, the cloud server includes a renderer configured to receive and process various kinds of output data, including low-level update commands, e.g., calls to interfaces of output libraries, such as graphics or audio libraries, or an already rendered output of the application. The renderer of the cloud server receives and processes the output data to generate a data stream, which is transferred to the digital reality devices. Because the heavy rendering is done on the cloud server, the quality of the rendered output of the application can be very high and may, for example, include a rich representation of highly detailed three-dimensional graphical objects and of sound effects and music, as required by the digital reality applications. Therefore, the digital reality devices are configured as lightweight clients, and hence are not concerned with heavy rendering tasks, needing only to be capable of adequately encoding and processing lightweight computational tasks on the data stream received from the cloud server.

In an embodiment, the cloud server system may be further programmed to enable the digital reality devices to switch between one public digital zone and another, including switching between augmented reality public digital zones, switching from augmented reality to virtual reality public digital zones, switching from virtual reality to augmented reality public digital zones, or switching between virtual reality public digital zones.

According to an embodiment, a method for enabling a public-to-personal digital reality experience transition is performed by a cloud server system comprising one or more server computers. The method comprises detecting one or more digital reality devices accessing a public digital reality zone associated with one or more digital reality applications (e.g., holographic—AR or VR—applications) stored in the cloud server system, where interactions with the one or more digital reality applications and corresponding digital content are viewable in a public digital reality view via the digital reality devices in the public digital zone; detecting a level of interaction with the digital content by at least one of the digital reality devices; determining that the detected level of interaction has reached a predetermined level of interaction with the digital content; and, after determining that the at least one digital reality device has reached the predetermined levels of interaction with the digital reality applications, enabling the at least one digital reality device to switch from a public digital reality view to a personal digital reality view comprising personal digital content viewable only to one or more authorized users (e.g., only a particular user, a first user and one or more invited users, etc.) interacting with the digital reality content.

According to an embodiment, the method for enabling a public-to-personal digital reality experience transition further comprises retrieving digital content from the one or more digital reality applications, and performing data computations and rendering on the digital content; sending, by the cloud server, the digital content to the digital reality devices in the current public digital reality zone; receiving, by the cloud server, input data from the digital reality devices; and updating the digital reality applications.

According to an embodiment, the method further comprises providing a specific amount of computational space to the digital reality devices accessing the personal digital reality view.

According to an embodiment, users in the personal digital reality view may have the option to invite other users. If other users accept, the cloud server allocates specific computational space for the additional users and shares the personal digital reality view with the shared users. Subsequently, the cloud server makes the necessary data computations and rendering to provide digital content within the personal shared view, and finally provides the digital content to the respective users.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below, and particularly pointed out in the claims filed with the application. Such combinations have particular advantages not specifically recited in the above summary Other features and advantages of the present disclosure will be apparent from the accompanying drawings and from the detailed description that follows below.

BRIEF DESCRIPTION OF THE DRAWINGS

Specific features, aspects and advantages of the present disclosure will be better understood with regard to the following description and accompanying drawings, where.

DETAILED DESCRIPTION

In the following description, reference is made to drawings which show by way of illustration various embodiments. Also, various embodiments will be described below by referring to several examples. It is to be understood that the embodiments may include changes in design and structure without departing from the scope of the claimed subject matter.

Figure 1A:
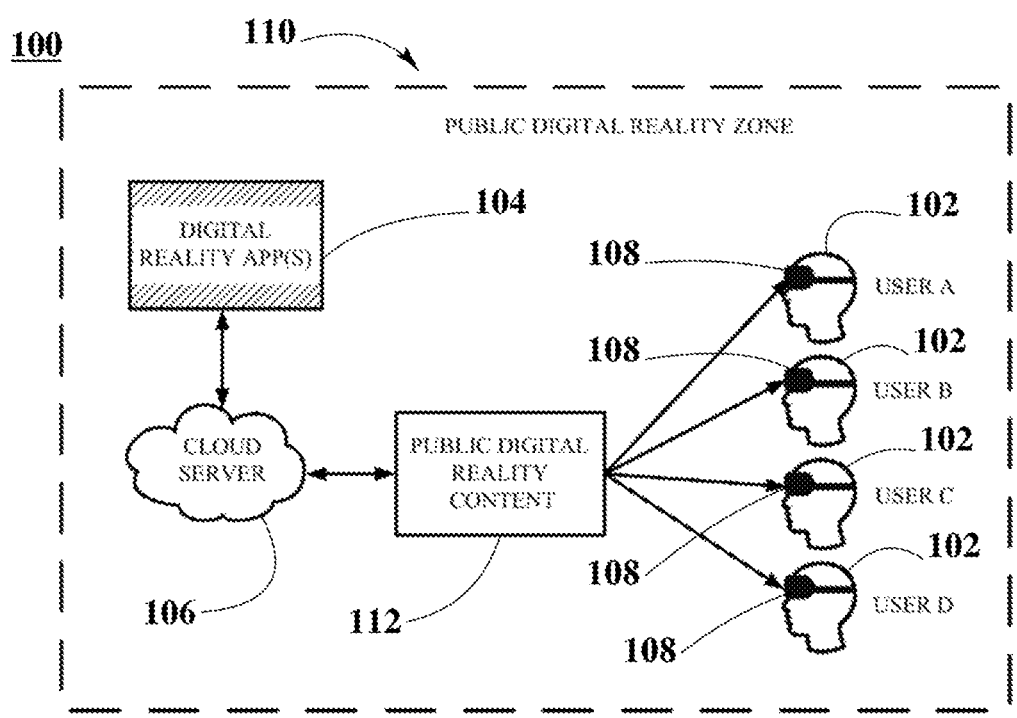
FIGS. 1A-1C depict a system for enabling public-to-personal digital reality experience transition, according to an embodiment.
Figure 1B:
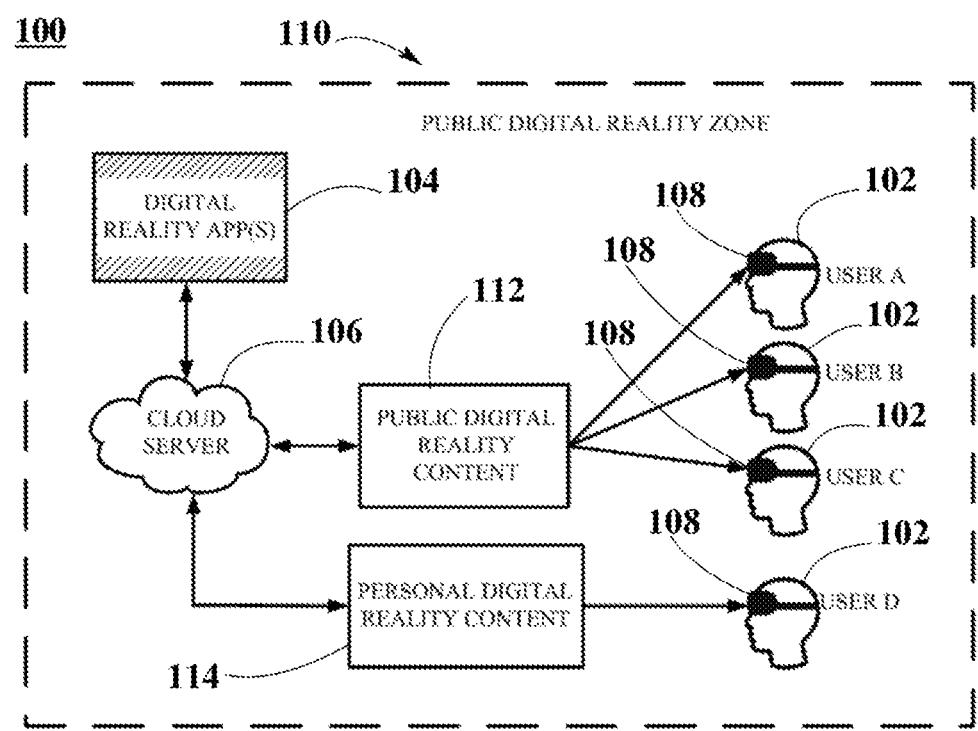
Figure 1C:
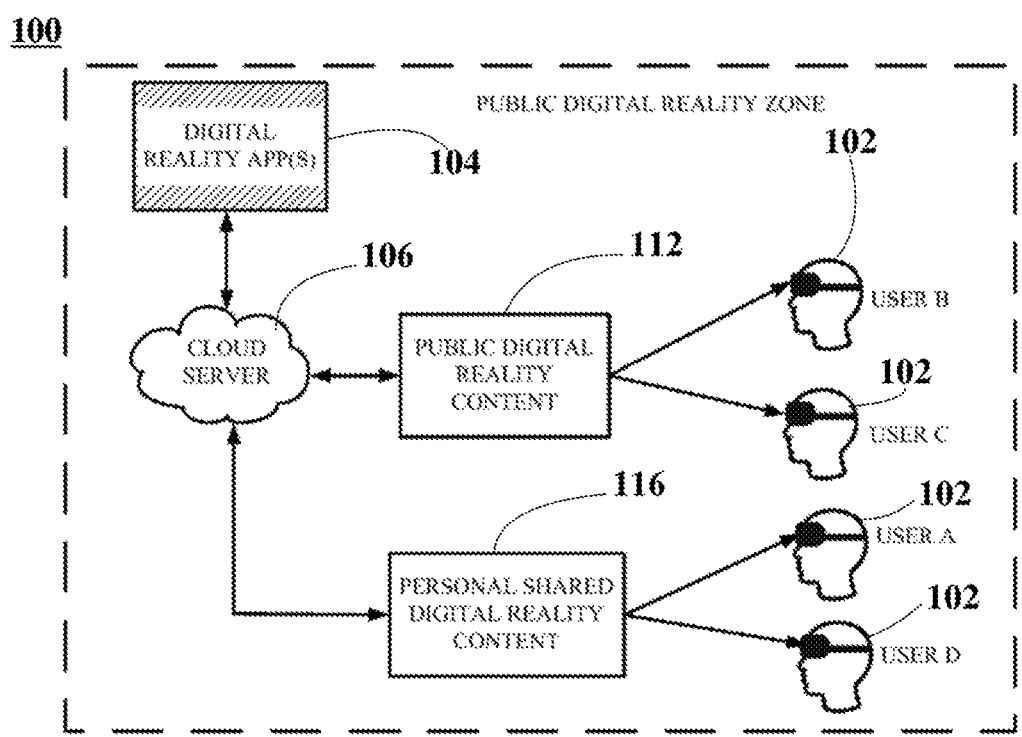

FIGS. 1A-C depicts a system 100 for enabling public-to-personal digital reality experience transition, according to an embodiment. In system 100, a user 102 may receive and experience digital content retrieved from one or more sources, such as one or more digital reality applications 104. The digital content is rendered by a cloud server 106 and viewed by a user 102 through a digital reality device 108 outputting the digital content. The digital reality devices 108 may be for example, mobile devices, personal computers, smart contact lenses, game consoles, media centers, and head-mounted displays, amongst others.

The system 100 of the current disclosure may be implemented in a cloud to edge infrastructure that may display distributed computing capabilities employing public or private clouds, fog servers, and edge devices and systems, such as enterprise systems, mobile platforms, and user devices, all of which may connect through a network. Using a cloud to edge computing network, access to computing power, computer infrastructure (e.g., through so-called infrastructure as a service, or IaaS), applications, and business processes can be delivered as a service to users via client devices on demand. This way, resources including physical servers and network equipment enable a shared storage and computing that may be dynamically allocated depending on factors such as the distance of the user to the resources and the network and computational demand from the users.

According to an embodiment, the digital content provided by the one or more digital reality applications 104 may include at least one of the following: 3D image data, 3D geometries, 3D entities, 3D sensory data, 3D dynamic objects, video data, audio data, textual data, time data, positional data, orientational data, haptic data, and lighting data, amongst others. In further embodiments, one or more parts of the digital content to be provided to the at least one user 102 in the public digital zone may include augmented reality (AR) or virtual reality (VR digital content. If a user 102 views the digital content as AR digital content, the AR digital content includes physical, real-world environment elements augmented by computer-generated sensory input such as sound, video, graphics, or GPS data. Augmentation techniques are typically performed in real-time and in semantic context with environmental elements, such as overlaying supplemental information or virtual objects in the real world. The AR digital content allows information about the surrounding real world of the user 102 or virtual objects overlay in the real world to become interactive and digitally manipulable. If a user 102 views the digital content as VR digital content, the VR digital content may include virtual elements that are used to replace the real world with a simulated one.

It should be understood that in any of the embodiments and described herein, functions described herein as being performed by the cloud server 106 need not be performed by only a single server and may instead be performed by a cloud server system comprise more than one server. According to an embodiment, the cloud server system may include one or more remote servers with computing resources sufficient to carry out heavy load applications such as rendering digital content from one or more digital reality applications 104.

The cloud server 106 may be configured to provide a combined single data stream to at least one digital reality device 108. In an embodiment, the cloud server 106 communicatively connects to the digital reality device 108 and to the digital reality applications 104 through different wireless systems including millimeter-wave (mmW) or combinations of mmW and sub 6 GHz communication systems, such as through $5^{th}$ generation wireless systems communication (5G). In other embodiments, the system may connect through a wireless local area networking (Wi-Fi) providing data preferably at 16 GHz. Provided communication systems may allow for low (e.g., about 1 to about 5 millisecond end-to-end (E2E)) latency and high (e.g., 1-10 Gbps) downlink speeds to end points in the field, complying with parameters necessary for executing the typically highly-interactive real-world projects. This results in high-quality, low latency, real-time digital application content streaming. In other embodiments, the system 100 may communicatively connect through 4th generation wireless systems communication (4G), may be supported by 4G communication systems, or may include other wired or wireless communication systems.

According to an embodiment, the cloud server 106 includes a renderer configured to receive and process various kinds of output data received from the one or more digital reality applications, including low-level update commands, e.g., calls to interfaces of output libraries, such as graphics or audio libraries, or an already rendered output of the digital reality applications. The renderer of the cloud server is configured to receive and to process the output data and to generate the data stream, which is transferred to the digital reality devices. Because the heavy rendering is done on the cloud server, the quality of the rendered output of the application can be very high and may, for example, comprise a rich representation of highly detailed three-dimensional graphical objects and of sound effects and music, as required by the digital reality experiences. Therefore, the digital reality devices are configured as lightweight clients, and hence are not concerned with heavy rendering tasks, needing only to be capable of adequately encoding and processing lightweight computational tasks on the data stream received from the cloud server.

According to an embodiment, each digital reality device 108 includes sensing mechanisms mounted thereon that include a combination of inertial tracking sensing mechanisms and transceivers. The inertial tracking sensing mechanisms can make use of devices such as accelerometers and gyroscopes, which may be integrated in an inertial measuring unit (IMU). The transceivers may be implemented to send and receive radio communication signals to and from antennas. Preferably, the transceivers are mmW transceivers. In embodiments where mmW antennas are employed, the mmW transceivers are configured to receive mmW signals from the antennas and to send the data back to the antennas. The inertial sensors, and positional tracking provided by mmW transceivers and the accurate tracking, low-latency and high quality of service (QOS) functionalities provided by mmW-based antennas may enable sub-centimeter or sub-millimeter positional and orientational tracking, which may increase accuracy when tracking the real-time position and orientation of the digital reality devices 108. In some embodiments, tracking by the second server may be implemented by employing several techniques known in the art, such as time of arrival (TOA), angle of arrival (AOA), or other tracking techniques known in the art (e.g., visual imaging, radar technology, etc.). In alternative embodiments, the sensing mechanisms and transceivers may be coupled together in a single tracking module device. Providing an accurate tracking of the digital reality devices 108 may result useful for displaying a reliable position and orientation of users, which may be relevant in order to show the digital content in a view that fits the user's viewing position and orientation.

In other embodiments, global navigation satellite systems (GNSS), which refers collectively to multiple satellite-based navigation systems like GPS, BDS, Glonass, QZSS, Galileo, and IRNSS, may be used for enabling positioning of devices. Employing signals from a sufficient number of satellites and techniques such as triangulation and trilateration, GNSS can calculate the position, velocity, altitude, and time of devices. In a preferred embodiment, the external positioning system is augmented by assisted GNSS (AGNSS) through the architecture of existing cellular communications network, wherein the existing architecture comprises 5G. In other embodiments, the AGNSS tracking system is further supported by a 4G cellular communications network. In indoor embodiments, the GNSS is further augmented via radio wireless local area networks such as Wi-Fi, preferably, but not limited to, providing data at 16 GHz. In alternative embodiments, the GNSS is augmented via other techniques known in the art, such as via differential GPS (DGPS), satellite-based augmentation systems (SBASs), real-time kinematic (RTK) systems. In some embodiments, tracking of devices is implemented by a combination of AGNSS and inertial sensors in the devices.

User interaction with digital content may be gesture-enabled, whereby the user 102 employs one or more gestures for interaction. For example, the gestures can be natural user interface (NUI) gestures. NUI may be defined as any interface technology that enables a user 102 to naturally interact with a device, free from artificial constraints imposed by input devices such as mice, keyboards, remote controls, and the like. Examples of NUI methods include those methods that employ gestures, such as tactile and non-tactile interfaces such as speech recognition, touch recognition, facial recognition, stylus recognition, air gestures (e.g., hand poses and movements and other body/appendage motions/poses), head and eye tracking, voice and speech utterances, and machine learning related at least to vision, speech, voice, pose, and touch data, for example. NUI technologies include touch sensitive displays, voice and speech recognition, intention and goal understanding, motion gesture detection using depth cameras (e.g., stereoscopic camera systems, infrared camera systems, color camera systems, and combinations thereof), motion gesture detection using accelerometers/gyroscopes, facial recognition, 3D displays, head, eye, and gaze tracking, immersive augmented reality and virtual reality systems comprising natural user interface, as well as technologies for sensing brain activity using electric field sensing electrodes (e.g., electro-encephalograph (EEG)) and other neuro-biofeedback methods.

As seen in FIG. 1A, a plurality of users 102, such as users A, B, C, and D are located in a public digital reality zone 110. In the public digital reality zone 110, the users 102 are able to receive, view, and interact, through the digital reality device 108, with public digital content 112 retrieved by the cloud server 106 from one or more digital reality applications 104. All of the users 102 in the public digital reality zone 110 are able to view the public digital reality content 112 from the one or more digital reality applications 104.

As seen in FIG. 1B, while users A, B, and C are still receiving, viewing, and interacting with the public digital content 112, user D is now receiving, viewing, and interacting with personal digital content 114. Thus, users A, B and C are able to view the interactions of each user with the public digital reality content 112 of the digital reality applications 104, while the interactions between user D and the digital reality application 104 become private and thus are not viewable by users A, B and C.

In some embodiments, user D may receive the personal digital content 114 after reaching different levels of interaction with the digital content. In one embodiment, the user D may receive personal digital content 114 after clicking on the digital content from the public digital content 112. In other embodiments, the user 102 may receive a personal digital content 114 through other forms of interaction with the digital content from the public digital content 112, such as through gestures, facial expressions, speech, body, hand or finger movements, stylus movements, air gestures, brain activity, and head and eye movements. Such embodiments provide smooth transitions from public to private digital reality experiences by reacting to levels of interaction with digital content to determine whether to perform the transition, without requiring a user to specifically select or request such a transition. This allows the user to enjoy the benefits of transitioning from a public experience of the digital content to a personal experience without interruption.

When user D starts receiving a personal digital content 114, a dedicated amount of computer power from the cloud server 106 is dedicated to the user D. At that moment, what started as a digital reality application 104 providing a public digital reality experience becomes a digital reality application 104 providing a private digital reality experience.

As seen in FIG. 1C, while users B and C are still receiving, viewing, and interacting with the public digital content 112, users A and D are now receiving, viewing, and interacting with a shared personal digital content 116. In order for user A to access a shared personal digital content 116, user D, which has already started receiving personal digital content 114, must invite user A to access this view. When user A starts receiving a shared personal digital content 116, a dedicated amount of computer power from the cloud server 106) is dedicated to user A.

Figure 2A:
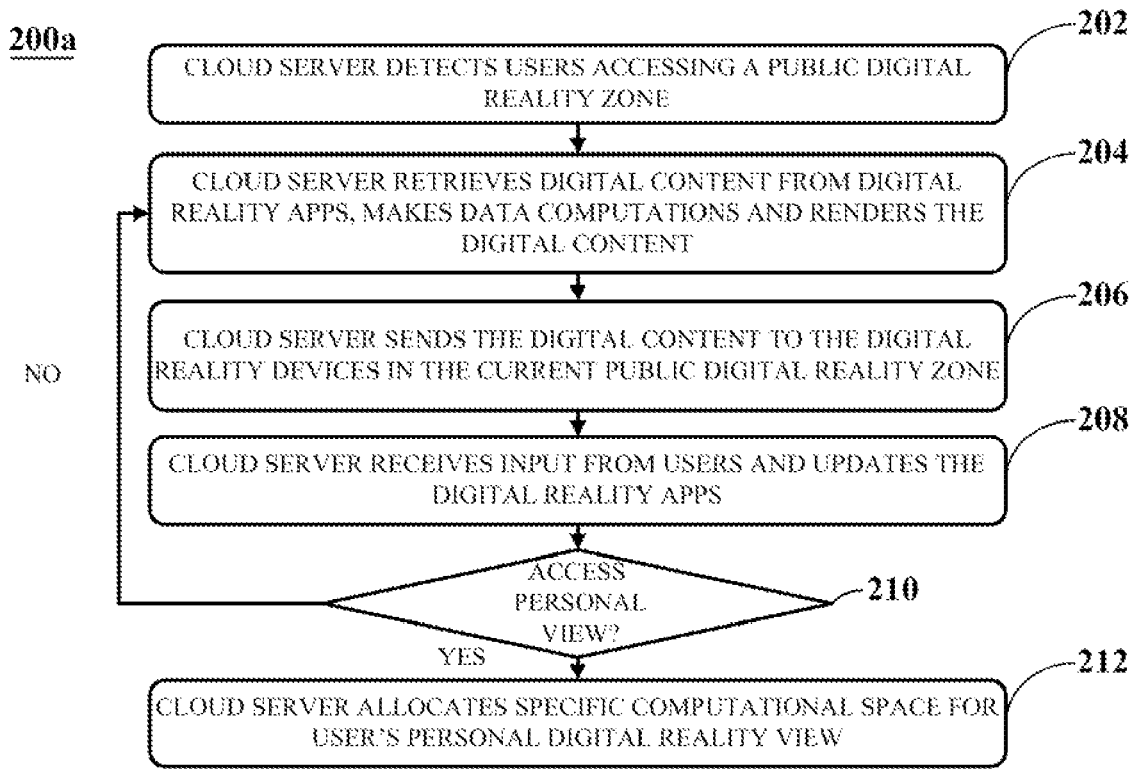
FIGS. 2A-2B depict a method for enabling public-to-personal digital reality experience transition, according to an embodiment.
Figure 2B:
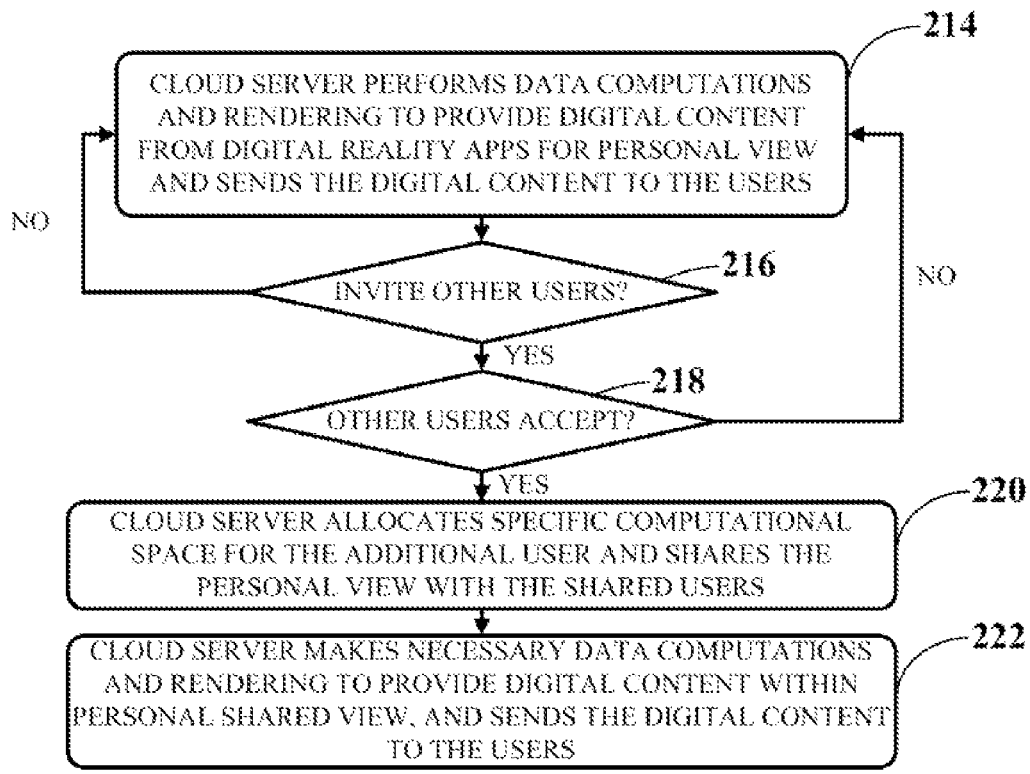

FIGS. 2A-2B show methods 200a-200b for enabling a public-to-personal digital reality experience transition, according to an embodiment.

Method 200a of FIG. 2A begins in step 202, where a cloud server detects one or more digital reality devices accessing a public digital reality zone associated with one or more digital reality applications stored in the cloud server, where interactions with the one or more holographic and corresponding digital content are viewable by all users in the public digital zone. Then, in step 204, the cloud server retrieves digital content associated with the digital reality application, making data computations, and rendering the digital content. Following the process, in step 206, the cloud server sends the digital content to the plurality of digital reality devices of users in the current public digital reality zone. The cloud server then receives input from users through the digital reality devices and updates the digital reality applications, as viewed in step 208.

In step 210, the method 200a provides the option to users to access a personal digital reality view, wherein a specific amount of computational space is provided to the digital reality devices accessing the personal digital reality view. Accessing the personal digital reality view may be done through various methods, such as clicking or other forms of interaction with the digital content. If the user does not decide to access a personal digital reality view, method 200 may return to step 204 with the user continuing to view public digital content. However, if the user decides to access a personal digital reality view, the cloud server allocates specific computational space for the user's personal digital reality view, as seen in step 212.

In some embodiments, the cloud server 106 is programmed to determine whether a user will transition to a personal digital reality view by detecting a digital reality device accessing the public digital reality zone; detecting a level of interaction with the digital content by the digital reality device; and determining that the detected level of interaction has reached a predetermined threshold level of interaction with the digital content. The possible levels of interaction include seeing the digital content, looking at the digital content, clicking on the digital content, engaging with the digital content, and immersing in the digital content. The threshold level of interaction to transition to the personal view may be, for example, clicking on or engaging with the digital content.

In an illustrative scenario, upon the cloud server detecting one or more digital reality devices accessing the public digital reality zone and after the digital reality devices reach predetermined levels of interaction with the digital content (e.g., the clicking level or the engaging level), the cloud server enables the digital reality devices to switch from a public digital reality view to a personal digital reality view comprising digital content.

In some embodiments, the cloud server system may associate the public digital reality zone with one or more digital reality applications by configuring geographical coordinates to predetermined values around locations associated with the one or more digital reality applications, such that the digital reality applications may be accessed through the digital reality devices only once the digital reality devices are located within the predetermined geographical coordinates. This association can be referred to as delimitating the public digital reality zone around a digital reality application. Said delimitation may be configured during the development stage of the corresponding applications 104. In yet a further embodiment, the public digital zone may vary based on achievements from users in holographic applications (e.g., AR or VR games or activities) and thus may change for one or more specific users 102. For example, a public digital zone comprising a treasure hunt application may be activated for all users 102 starting on a first level of said application, but once one or more users 102 find a treasure within the public digital zone, the public digital zone may move to another geographic location only for those specific one or more users 102 that have found the treasure.

FIG. 2B depicts method 200b, which is a continuation of method 200a. In step 214, the cloud server makes the necessary data computations and rendering to provide digital content from the digital reality application for the personal digital reality view, thereafter providing the digital content to the respective users. Further in step 214, it is to be understood that the cloud server may as well keep receiving input from users in the private view through the digital reality devices, which trigger the server to continue updating the digital reality applications that is then sent and output by the digital reality devices.

Afterwards, method 200b provides users who are currently in the personal digital reality view an option to invite other users to access the same personal digital reality view, as seen in step 216. Users may either approve or reject the invitation to the personal digital reality view, as viewed in step 218. If users approve the invitation, the cloud server allocates specific computational space for the additional user and shares the personal digital reality view with the shared users, as seen in step 220. If users reject the invitation, the user in the original private view may individually continue receiving the personal digital content, whereby the method goes back to step 214 detailed above. Finally, in step 222 the cloud server makes necessary data computations to provide digital content within the personal shared view and provides the digital content to the respective users. Further in step 222, it is to be understood that the cloud server may as well keep receiving input from users in the private shared view through the digital reality devices, which trigger the server to continue updating the digital reality applications that is then sent and output by the digital reality devices.

Figure 3:
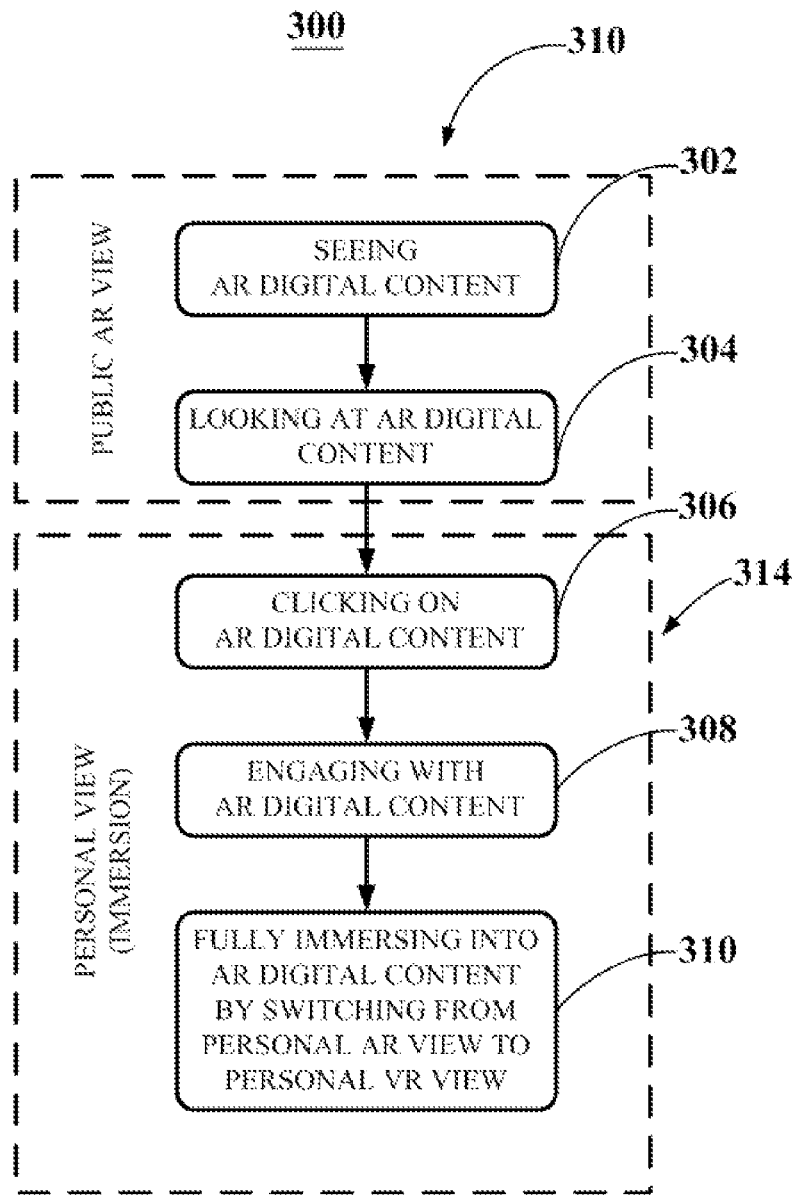
FIG. 3 depicts various forms of AR interactions that users may have with digital content in a public AR zone, according to an embodiment.

FIG. 3 illustrates various forms of AR interactions 300 that users may have with digital content in a public AR zone, according to an embodiment. AR Interactions 300 with the AR digital content from the digital reality application include seeing 302, looking at 304, clicking 306 on, engaging 308 with, and fully immersing 310 into the AR digital content from the one or more digital reality applications.

In some embodiments, when users are seeing 302 at and looking at 304 the public AR digital content from the one or more digital reality applications, the users are able to access a public AR view 312, whereby the users receive, view, and interact with the public AR digital content. When users click 306 on the AR digital content in the public AR view 312, users are able to access a personal digital reality view 314, whereby the users receive, view, and interact with personal AR digital content. All levels of AR interaction 300 within the personal digital reality view 314 are considered to be an immersion into the AR digital content.

The term "clicking on" may be used to include the act of clicking digital content with a mouse but may also include other forms of input (e.g., tapping) suited to other input devices (e.g., track pads and touch screens) that may be used for selecting particular digital content.

The term "seeing", as used in the current disclosure in the context of AR interactions 300, refers to the act of directing one's eyes for a limited number of seconds (i.e., including a time component) or towards a limited number of interest points (i.e., including a spatial component) in the direction of the AR digital content from the digital reality application. The term "looking", as used in the current disclosure in the context of AR interactions 300, may also include a time component and/or a spatial component, and refers to the act of fixing one's eyes for a number of seconds greater than that of "seeing", or to a certain number of interest points greater than that of "seeing".

The term "engaging", as used in the current disclosure in the context of AR interactions 300, refers to deeper levels of interaction including gestures, facial expressions, speech, body, hand or finger movements (e.g., horizontal or vertical movements at any angle, rotation around an axis, etc.), zooming in or out, stylus movements, air gestures, brain activity, and head and eye movements but excluding the simpler forms of interaction such as looking, seeing, and clicking.

The term "fully immersing" or "full immersion", as used in the current disclosure in the context of AR interactions 300, refers to the deepest level of interaction, and may include switching from the current personal AR view to a personal VR view. Fully immersing includes all interactions that take place when the one or more users are in the private VR view. In a private VR view, the digital reality application provides private sessions to users, making the digital content available only to the specific users in those private views.

Figure 4:
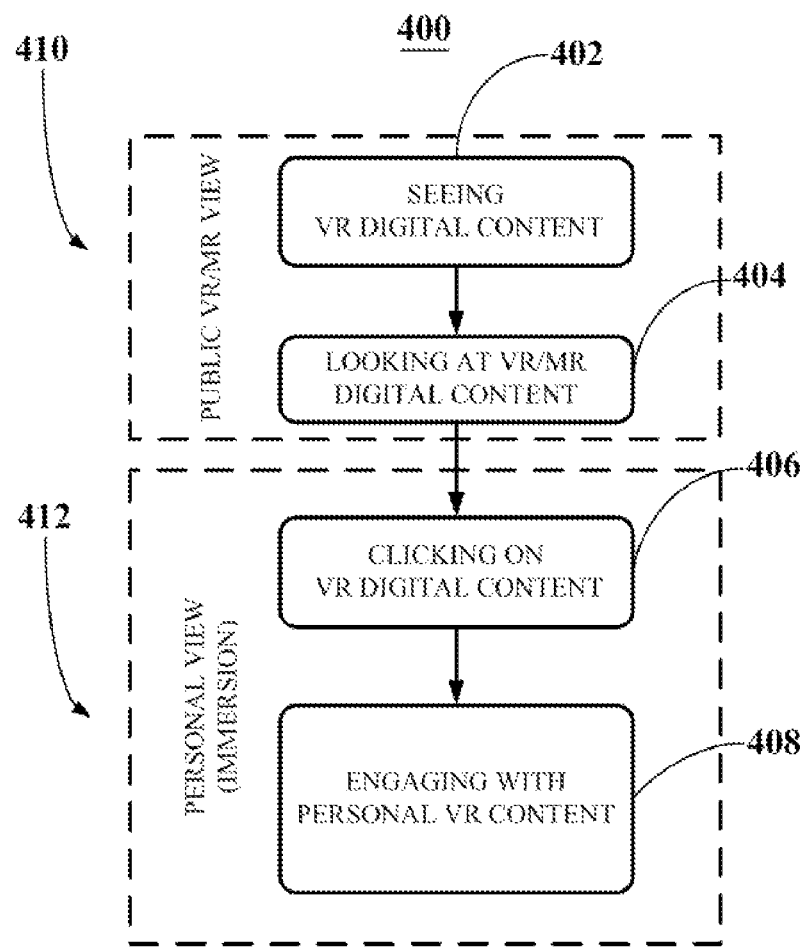
FIG. 4 depicts various forms of VR interactions that users may have with digital content in a public VR zone, according to an embodiment.

FIG. 4 illustrates various forms of VR interactions 400 that users may have with digital content in a public VR zone, according to an embodiment. VR interactions 400 with the VR digital content from the digital reality application include seeing 402, looking at 404, clicking 406 on, and fully immersing 408 into the VR digital content from the one or more digital reality applications.

When users are seeing 402 and looking at 404 the VR digital content from the one or more digital reality applications, the users are able to access a public VR view 410, whereby the users receive, view, and interact with public digital content. When users click 406 on the VR digital content in the public VR view 410, users are able to access a personal digital reality view 412, whereby the users receive, view, and interact with the now personal VR digital content.

The term "seeing", as used in the current disclosure in the context of VR interactions 400, refers to the act of directing one's eyes for a limited number of seconds (i.e., including a time component) or towards a limited number of interest points (i.e., including a spatial component) in the direction of the VR digital content from the digital reality application. The term "looking", as used in the current disclosure in the context of VR interactions 400, may also include a time component and/or a spatial component, and refers to the act of fixing one's eyes for a number of seconds greater than that of "seeing", or to a certain number of interest points greater than that of "seeing".

The term "fully immersing" or "full immersion", as used in the current disclosure in the context of VR interactions 400, refers to switching from the current public VR view 410 to a personal VR view and engaging with the VR view within the personal VR view. Engagement interactions within a full immersion may include gestures, facial expressions, speech, body, hand or finger movements (e.g., horizontal or vertical movements, rotation, etc.), zooming in or out, stylus movements, air gestures, brain activity, and head and eye movements within the private VR view. In a private VR view, the digital reality application provides private sessions to users, making the digital content available only to the specific users in the private VR view.

In some embodiments, data representing interactions and/or related transition events may be stored and analyzed. The transition and interaction data of one or more users over time may form a history of interactions and transitions. In yet a further embodiment, transition and interaction data are registered in storage database, such as a blockchain or distributed ledger-based database. In this way, the system may store proof of transactions or interactions, which may have significant commercial value. For example, data related to the history of interactions, including related transitions from public to private views, may be analyzed in order to automate the handling of business related commercial logic to support digital media buying models, market research, and business analysis through, for instance, analysis of accumulations of impressions, interaction-related pay-out (e.g., assessment of gaze time and associated pay-out), revenue splits, and the like.

While certain embodiments have been described and shown in the accompanying drawings, it is to be understood that such embodiments are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

The invention claimed is:

1. A system for enabling a public-to-personal digital reality experience transition, the system comprising:
   a cloud server system comprising one or more server computers, the cloud server system storing one or more digital reality applications and being programmed to:
   delimitate a public digital zone where interactions with the one or more digital reality applications stored in the cloud server and corresponding digital content are viewable in a public digital reality view via digital reality devices in the public digital zone, wherein the public digital zone is configured to move from one geographic location to another responsive to user interaction with the one or more digital reality applications;
   detect at least one of the digital reality devices accessing the public digital reality zone;
   detect a level of interaction with the digital content by the at least one digital reality device, wherein the detected level of interaction comprises a first level of seeing or looking at the digital content;
   determine that the detected level of interaction has increased from the first level and reached a predetermined second level of interaction with the digital content, wherein the second level of interaction comprises clicking, engaging with, or immersing in the digital content; and
   in response to determining that the detected level of interaction by the at least one digital reality device has increased from the first level and reached the predetermined second level of interaction with the digital content, enable the at least one digital reality device to switch from the public digital reality view to a personal digital reality view comprising personal digital content viewable only by one or more authorized users interacting with the digital content.

2. The system of claim 1, wherein the cloud server system is further programmed to:
   retrieve the digital content from the one or more digital reality applications, and perform data computations and rendering on the digital content;
   send the digital content to the digital reality devices in the public digital reality zone;
   receive input data from the digital reality devices; and
   update the one or more digital reality applications.

3. The system of claim 1, wherein the cloud server system is further programmed to, when the at least one digital reality device starts receiving personal digital content, allocate a dedicated amount of computing power for the at least one digital reality device.

4. The system of claim 1, wherein the one or more digital reality applications are configured to provide options enabling inviting other users to join the personal digital reality view, and wherein the cloud server system is further programmed to, upon acceptance of an invitation to join the personal digital reality view, allocate specific computational space for one or more additional digital reality devices and share the personal digital reality view with the users that accept the invitation.

5. The system of claim 1, wherein the public digital zone is a public augmented reality zone or a public virtual reality zone.

6. The system of claim 1, wherein the cloud server system is further programmed to:
receive input data from the at least one digital reality device, wherein the received input data comprises input associated with clicking on public augmented reality content or public virtual reality content from a respective public augmented reality zone or public virtual reality zone; and
provide, in response to the received input data, the at least one digital reality device with access to a personal augmented reality view or a personal virtual reality view.

7. The system of claim 6, wherein the received input data further comprises one or more of gestures, facial expressions, speech, touch, stylus movements, air gestures, brain activity, or head and eye movements.

8. The system of claim 6, wherein levels of interaction within the personal augmented reality view comprise engaging with the augmented reality content, and fully immersing into the augmented reality content by switching from the personal augmented reality view to the personal virtual reality view, and wherein levels of interaction within the personal virtual reality view comprise engaging with the personal virtual reality content.

9. The system of claim 1, wherein the cloud server system is further programmed to enable the digital reality devices to switch between one public digital zone and another, including switching between augmented reality public digital zones, switching from augmented reality to virtual reality public digital zones, switching from virtual reality to augmented reality public digital zones, or switching between virtual reality public digital zones.

10. The method of claim 9, further comprising:
providing, by the one or more digital reality applications, options enabling inviting other users to join the personal digital reality view; and
if invited users accept an invitation to join the personal digital reality view, allocating, by the cloud server system, specific computational space for one or more additional digital reality devices and sharing the personal digital reality view with the users that accept the invitation.

11. The method of claim 9, wherein the public digital zone is a public augmented reality zone or a public virtual reality zone.

12. The method of claim 11 further comprising:
receiving input data from the at least one digital reality device, wherein the received input data comprises input associated with clicking on public augmented reality content or public virtual reality content from the respective public augmented reality zones or public virtual reality zones; and
providing, in response to the received input data, the at least one digital reality device with access to a personal augmented reality view or a personal virtual reality view.

13. The method of claim 12, wherein the received input data further comprises one or more of gestures, facial expressions, speech, body, hand or finger movements, stylus movements, air gestures, brain activity, or head and eye movements.

14. The method of claim 12, wherein levels of interaction within the personal augmented reality view comprise engaging with the augmented reality content, and fully immersing into the augmented reality content by switching from the personal augmented reality view to the personal virtual reality view, and wherein levels of interaction within the personal virtual reality view comprise engaging with the personal virtual reality content.

15. A method for enabling a public-to-personal digital reality experience transition comprising, by a cloud server system comprising one or more server computers:
detecting that digital reality devices are accessing a public digital reality zone associated with one or more digital reality applications stored in the cloud server system, where interactions with the one or more digital reality applications and corresponding digital content are viewable in a public digital reality view via the digital reality devices in the public digital zone, wherein the public digital zone is configured to move from one geographic location to another responsive to user interaction with the one or more digital reality applications;
detecting a level of interaction with the digital content by at least one of the digital reality devices, wherein the detected level of interaction comprises a first level of seeing or looking at the digital content;
determining that the detected level of interaction has increased from the first level and reached a predetermined second level of interaction with the digital content, wherein the second level of interaction comprises clicking, engaging with, or immersing in the digital content; and
in response to determining that the detected level of interaction by the at least one digital reality device has increased from the first level and reached the predetermined second level of interaction with the digital reality applications, enabling the at least one digital reality device to switch from the public digital reality view to a personal digital reality view comprising personal digital content viewable only by one or more authorized users interacting with the digital content.

16. The method of claim 15, further comprising:
retrieving, by the cloud server system, the digital content from the one or more digital reality applications, and performing data computations and rendering on the digital content;
sending, by the cloud server, the digital content to the digital reality devices in the public digital reality zone;
receiving, by the cloud server, input data from the digital reality devices; and
updating the one or more digital reality applications.

17. The method of claim 15, further comprising providing a specific amount of computational space to the at least one digital reality device accessing the personal digital reality view.

18. The method of claim 15, further comprising enabling the digital reality devices to switch between one public zone and another, including switching between augmented reality public digital zones, switching from augmented reality to virtual reality public digital zones, switching from virtual reality to augmented reality public digital zones, or switching between virtual reality public digital zones.

19. A non-transitory computer storage medium having stored thereon computer-executable instructions configured to cause a cloud computer system to perform steps comprising:

detecting that digital reality devices are accessing a public digital reality zone associated with one or more digital reality applications stored in the cloud server system, where interactions with the one or more digital reality applications and corresponding digital content are viewable in a public digital reality view via the digital reality devices in the public digital zone, wherein the public digital zone is configured to move from one geographic location to another responsive to user interaction with the one or more digital reality applications;

detecting a level of interaction with the digital content by at least one of the digital reality devices, wherein the detected level of interaction comprises a first level of seeing or looking at the digital content;

determining that the detected level of interaction has increased from the first level and reached a predetermined second level of interaction with the digital content, wherein the second level of interaction comprises clicking, engaging with, or immersing in the digital content; and in response to determining that the detected level of interaction by the at least one digital reality device has increased from the first level and reached the predetermined second level of interaction with the digital reality applications, enabling the at least one digital reality device to switch from the public digital reality view to a personal digital reality view comprising personal digital content viewable only by one or more authorized users interacting with the digital content.

20. The non-transitory computer-readable medium of claim 19, the steps further comprising:

retrieving, by the cloud server system, the digital content from the one or more digital reality applications, and performing data computations and rendering on the digital content;

sending, by the cloud server, the digital content to the digital reality devices in the public digital reality zone;

receiving, by the cloud server, input data from the digital reality devices; and updating the one or more digital reality applications.

\* \* \* \* \*